United States Patent [19]
Kilty et al.

[11] Patent Number: 5,911,893
[45] Date of Patent: *Jun. 15, 1999

[54] ARC WELDING METHOD AND APPARATUS WITH POWER CABLE FATIGUE MONITOR

[75] Inventors: Alan L. Kilty, Peoria; Richard A. Stear, Mapleton, both of Ill.

[73] Assignee: Caterpillar Inc., Peoria, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/690,264

[22] Filed: Jul. 24, 1996

[51] Int. Cl.⁶ .................................................. B23K 9/095
[52] U.S. Cl. ............................. 219/130.21; 219/130.01; 219/137 PS
[58] Field of Search .................. 219/130.01, 130.21, 219/137 PS, 130.31, 109, 110

[56] References Cited

U.S. PATENT DOCUMENTS

| | | | |
|---|---|---|---|
| 3,603,846 | 9/1971 | Toth | 219/130.32 |
| 4,079,231 | 3/1978 | Toth | 219/130.32 |
| 4,301,355 | 11/1981 | Kimbrough et al. | 219/130.31 |
| 4,647,751 | 3/1987 | Yoshimura et al. | 219/109 |
| 4,739,149 | 4/1988 | Nishiwake et al. | 219/130.01 |
| 4,973,813 | 11/1990 | Mitchell | 219/109 |
| 5,262,609 | 11/1993 | Nowak et al. | 219/109 |
| 5,637,241 | 6/1997 | Moates | 219/109 |

*Primary Examiner*—Clifford C. Shaw
*Attorney, Agent, or Firm*—John J. Cheek; Kevin M. Kercher

[57] ABSTRACT

A welding apparatus includes a welding torch and a workpiece support. The welding apparatus also includes a circuit for creating a first voltage drop between the welding torch and the workpiece support so as to generate heat which melts a quantity of weld wire, the creating circuit having a power supply. The apparatus system further includes a power cable which is electrically interposed between the power supply and the welding torch. Additionally, the welding apparatus includes a circuit for measuring a second voltage drop across the power cable at the same time the first voltage drop is being created by the creating circuit. A method of operating a welding system is also disclosed.

16 Claims, 7 Drawing Sheets

Fig_2_

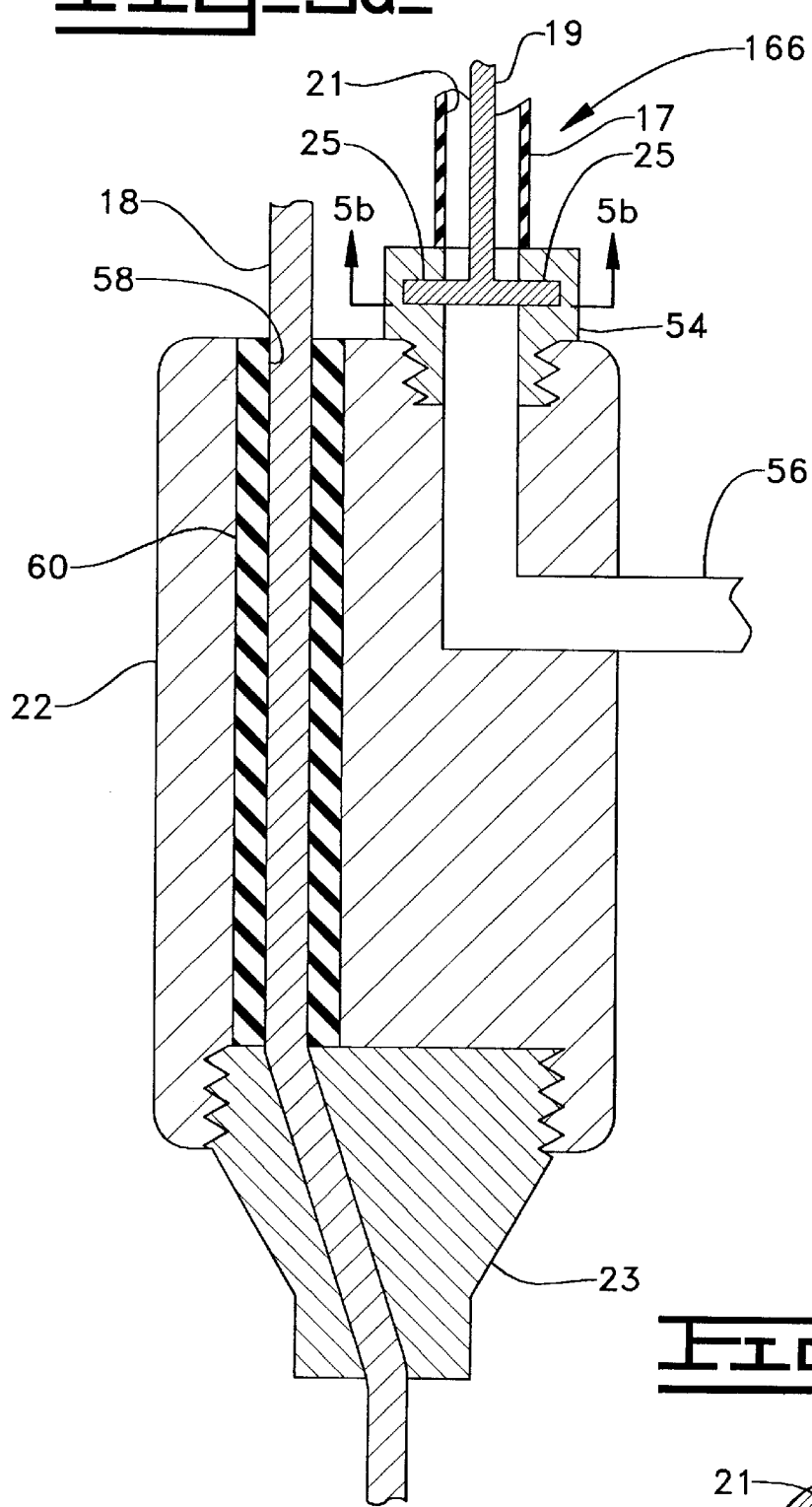
Fig_5a_
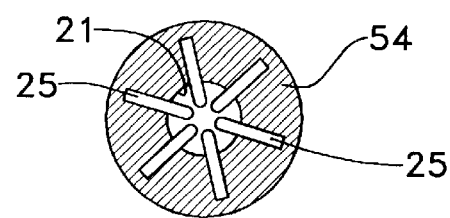
Fig_5b_

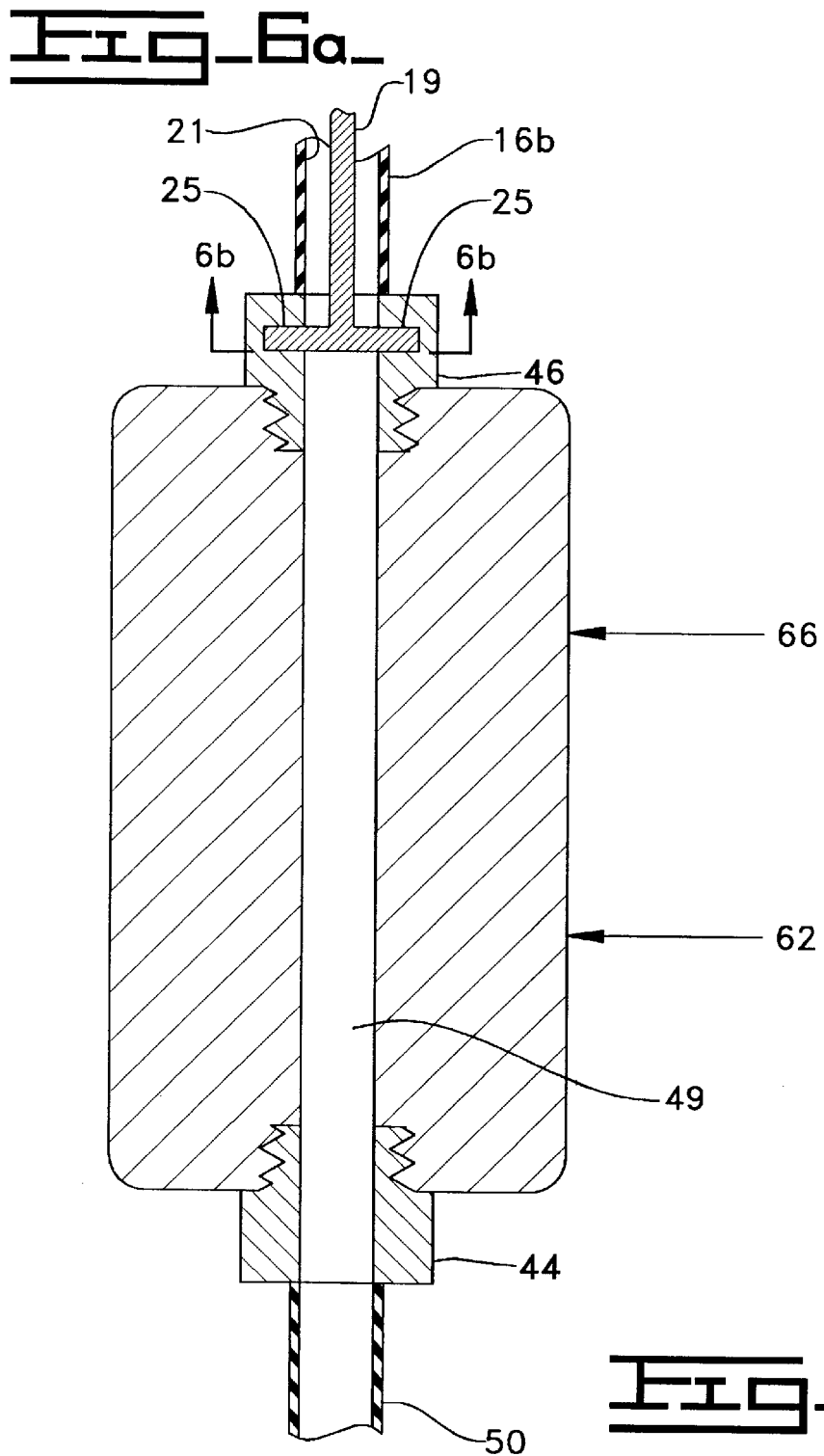

ARC WELDING METHOD AND APPARATUS WITH POWER CABLE FATIGUE MONITOR

BACKGROUND OF THE INVENTION

The present invention relates generally to a welding system, and more specifically to a method and an apparatus for predicting the life expectancy of a water cooled power cable used in a welding system.

A welding system is used to fuse two or more work pieces together. A welding system accomplishes this by creating a weld seam between the two work pieces. The weld seam is formed by placing a molten metal between the two work pieces to create a bond which holds them together. The molten metal may be created by passing a strand of weld wire through a weld torch and then applying a large amount of current to the weld torch so as to create an electrical arc thereby generating the heat necessary to melt the weld wire and form the molten metal.

In many automated welding systems, robots, known as welding robots, are used to create the necessary welds. Welding robots are controlled by software being executed on a computer which is connected to the welding robot by interface cables. A welding robot has a mechanical arm for holding the weld torch. This arm is generally designed with a number of flexible joints to allow the mechanical arm to move in a variety of directions in order to reach the various weld locations on the work piece.

A power cable is connected between the weld torch and a power source. The power cable must therefore be capable of flexing to accommodate movement of the mechanical arm of the welding robot. Additionally, the power cable must be capable of withstanding extremely high temperatures associated with high power requirements placed upon it. Hence, many modern weld power cables are water cooled. A water cooled power cable consists of a number of copper or other highly conductive metal strands intertwined to create a cable which is surrounded by a liquid impermeable sleeve. Water is pumped through the sleeve. The water removes the heat from the copper cable. This type of water cooled power cable generally has a longer useful life than do power cables which are not water cooled.

Over the life of the water cooled power cable, the copper strands of the cable tend to break as a result of the repeated twisting and bending of the mechanical arm of the welding robot. As this occurs, the electrical current carrying capability of the water cooled power cable is reduced. If the current of the welding system is not maintained at a certain level, the quality of the welds produced by the welding robot will degrade. Eventually, the resistance of the cable will become so great due to the breakage of additional copper strands, that the cable will ignite, incinerate and thereby destruct. Often, other components of the welding robot are damaged or destroyed as the cable incinerates. This results in costly repairs to the welding robot along with extended downtime.

Welding systems have heretofore been designed which include an electrical current detector which measures the magnitude of a specific current in the welding system. If the current falls below a predetermined level, an audible alarm is given to the operator of the welding system so that the operator can take the necessary steps to correct the problem. However, this type of monitoring system does not reveal the cause of the low current level.

Further, U.S. Pat. No. 5,262,609 issued to Nowak et al teaches a self-diagnosing resistance welding cable and method for monitoring the relative increase in cable resistance while the cable is in use, without disconnecting the cable. The cable incorporates a reference resistor in one of the terminals in thermal communication with the cable, such that a comparison in resistance variation between the cable and reference resistor cancels the effects of temperature variation on resistance change. The reference resistor is connected in series with the cable in an electrical test circuit. A reference voltage is applied across the test circuit each time the welding tips of the robot are opened.

Some of the aforementioned designs require that the welding operation be interrupted so that a determination can be made as to whether the water cooled power cable has electrically deteriorated sufficiently as to require replacement. This interruption in the welding operation causes a reduction in performance of the welding system. In particular, the number of welds the welding system can create over a given period of time is reduced. Moreover, the aforementioned designs do not provide any feedback control to the welding process, but rather only predict when the water cooled power cable is at the end of its useful life.

What is needed therefore is an apparatus and method that measures the electrical properties of a water cooled power cable to predict the life expectancy of the power cable which does not reduce the welding performance of a welding system. Moreover, it is desirable to provide an apparatus and method which provides feedback data to the welding system in order to reduce the welding defects resulting from the wear of the water cooled power cable.

SUMMARY OF THE INVENTION

In accordance with one embodiment of the present invention, there is provided a method of operating a welding system having a workpiece support, a power supply, a welding torch, and a power cable which is electrically interposed between the power supply and the welding torch The method includes the steps of (1) creating a first voltage drop with the power supply between the welding torch and the workpiece support so as to generate heat which melts a quantity of weld wire, and (2) measuring a second voltage drop across the power cable, wherein the creating step and the measuring step are performed concurrently.

Pursuant to a another embodiment of the invention, there is provided a welding apparatus which includes a welding torch and a workpiece support. The welding apparatus further includes a circuit for creating a first voltage drop between the welding torch and the workpiece support so as to generate heat which melts a quantity of weld wire, the creating circuit having a power supply. The welding apparatus additionally includes a power cable which is electrically interposed between the power supply and the welding torch. Moreover, the welding apparatus includes a circuit for measuring a second voltage drop across the power cable at the same time the first voltage drop is being created by the creating circuit.

According to yet another embodiment of the present invention, there is provided a method of performing a welding operation on a workpiece with a welding system having a power supply, a welding torch, and a power cable which is electrically interposed between the power supply and the welding torch. The method includes the steps of (1) creating a first voltage drop with the power supply between the welding torch and the workpiece so as to generate heat which melts a quantity of weld wire, and (2) measuring a second voltage drop across the power cable, wherein the creating step and the measuring step are performed concurrently.

It is therefore an object of this invention to provide a new and useful method for operating a welding apparatus.

It is a further object of this invention to provide an improved welding apparatus.

It is another object of this invention to provide a welding apparatus which monitors the condition of a power cable.

It is another object of this invention to provide a welding apparatus which predicts the life expectancy of the power cable.

It is another object of this invention to provide a welding apparatus which can provide feedback within the welding system so as to regulate a welding current across a welding arc.

It is another object of this invention to provide a welding apparatus which measures the electrical properties of a water cooled power cable to predict the life expectancy of the power cable which does not reduce the welding performance of a welding system.

It is another object of this invention to provide a welding apparatus which provides feedback data to the welding system in order to reduce the welding defects resulting from the wear of the water cooled power cable.

It is a yet another object of this invention to provide a new and useful method of operating a welding system.

It is a still another object of this invention to provide an improved method of operating a welding system.

It is another object of this invention to provide a method of operating a welding system which monitors the condition of a power cable.

It is another object of this invention to provide a method of operating a welding system which predicts the life expectancy of the power cable.

It is another object of this invention to provide a method of operating a welding system which can provide feedback within the welding system so as to regulate a welding current across a welding arc.

It is another object of this invention to provide a method of operating a welding system which measures the electrical properties of a water cooled power cable to predict the life expectancy of the power cable which does not reduce the welding performance of a welding system.

It is another object of this invention to provide a method of operating a welding system which provides feedback data to the welding system in order to reduce the welding defects resulting from the wear of the water cooled power cable.

The above an other objects, features, and advantages of the present invention will become apparent from the following description and the attached drawings.

BRIEF DESCRIPTION OF THE DRAWINGS

FIG. 5A is a cross sectional view of a torch used in the arc welding system of FIG. 1;

FIG. 5B is a cross sectional view taken along the lines 5B—5B of FIG. 5A as viewed in the direction of the arrows;

FIG. 6A is a cross sectional view of a power block used in the arc welding system of FIG. 1;

FIG. 6B is a cross sectional view taken along the lines 6B—6B of FIG. 6A as viewed in the direction of the arrows.

DETAILED DESCRIPTION OF THE PREFERRED EMBODIMENT

Figure 1:
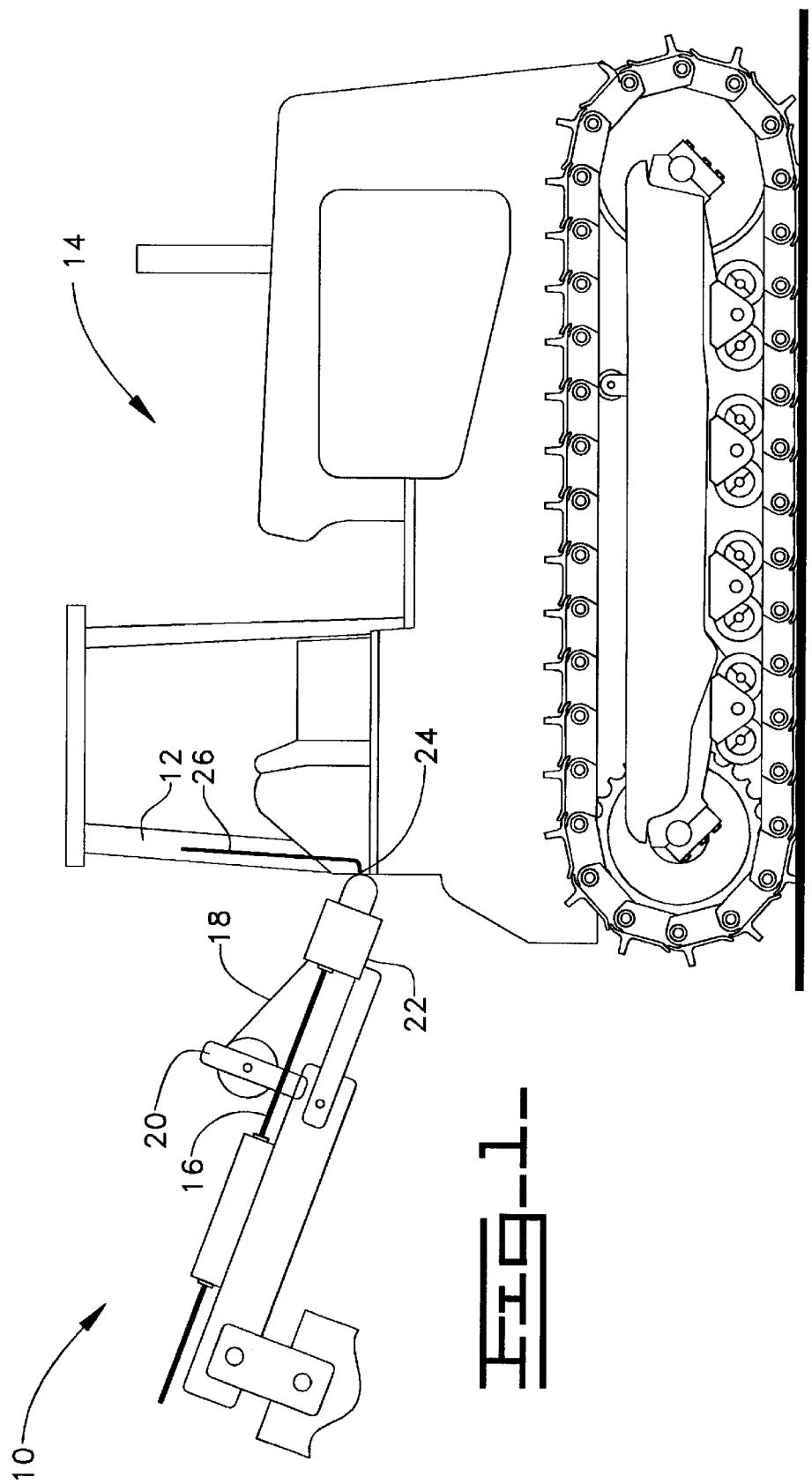
FIG. 1 is a fragmentary perspective view of a portion of a tractor being welded by an arc welding system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the appended claims.

Referring now to FIG. 1, there is shown a welding system 10 which is performing a welding operation on a tractor 14. The welding system 10 includes a power cable 16, a quantity of weld wire 18, a weld wire feeder 20, and a torch 22.

The power cable 16 conveys power to the torch 22 which creates a welding arc 24. The weld wire feeder 20 feeds the weld wire 18 into the torch 22 where the weld wire 18 is changed from a solid state to a molten state by the welding arc 24. The welding arc 24, along with the molten weld wire 18, creates a weld seam 26 on the work piece 12. Here, the work piece 12 is depicted as a body section of the tractor 14.

The welding system 10 is described performing an arc welding operation. However, it should be appreciated that the welding system 10 could be performing any type of welding operation. For example, the welding system 10 could be performing a spot welding operation.

Due to the large amount of current passing through it, the power cable 16 reaches extremely high temperatures. If the temperature becomes too great, the power cable will destruct. Therefore, the power cable 16 of the arc welding system 10 is a water cooled power cable.

Figure 2:
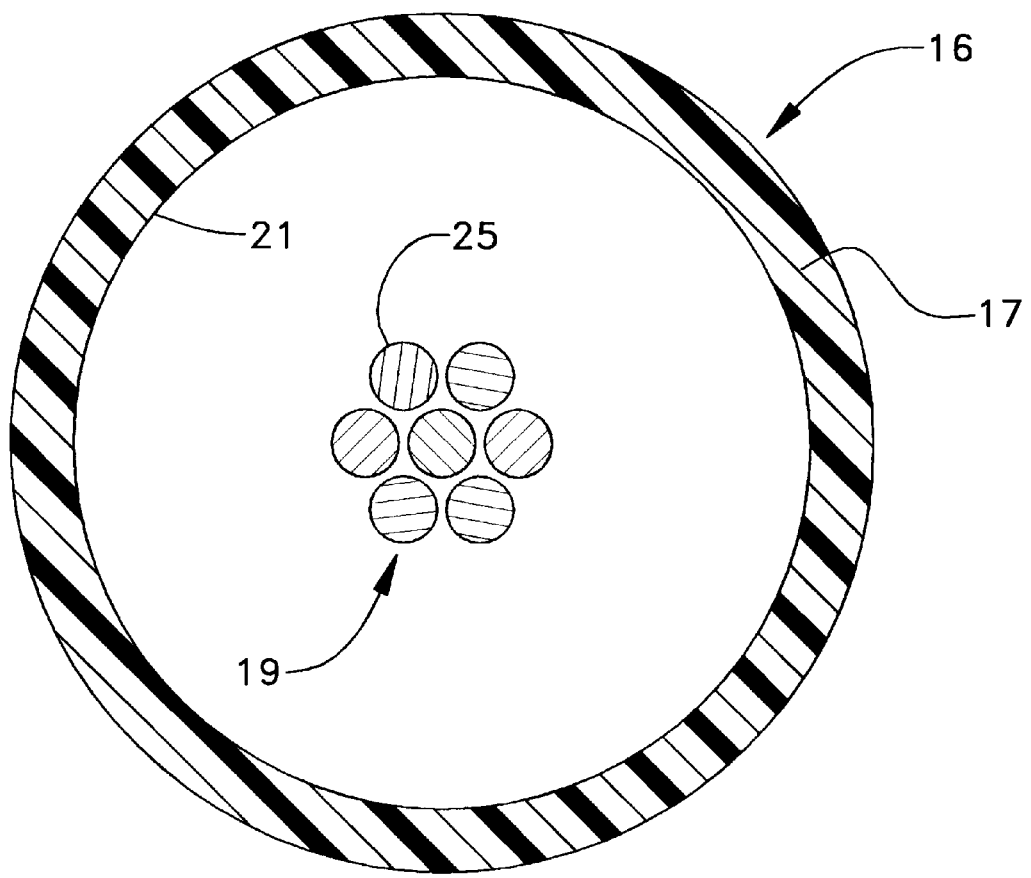
FIG. 2 is a cross sectional view of a water cooled power cable of the arc welding system of FIG. 1.

FIG. 2 is a cross sectional view of the water cooled power cable 16 of the welding system 10. The water cooled power cable 16 includes a sleeve 17 which envelopes a cable 19 and thus creates a fluid area 21. Water, or a similar fluid, is pumped through the fluid area 21 to remove heat from the cable 19.

The cable 19 includes a plurality of metal strands 25. Typically, the strands 25 are made of copper, or a similar conductive metal. The strands 25 are wound upon each other to increase the durability of the cable 19. As the water cooled power cable 16 begins to wear, the strands 25 break due to the repeated twisting and bending caused by the motion of the moving parts of the welding system 10. As the strands 25 break, the voltage drop across the water cooled power cable 16 increases. This is due to an increase in resistance as a result of having fewer strands 25 coupling one end of the water cooled power cable 16 to the other end of the water cooled power cable 16. What is meant herein by the term "the voltage drop across the water cooled power cable" is the voltage drop measured from one end of the water cooled power cable 16 to the other end of the water cooled power cable 16.

Figure 3:
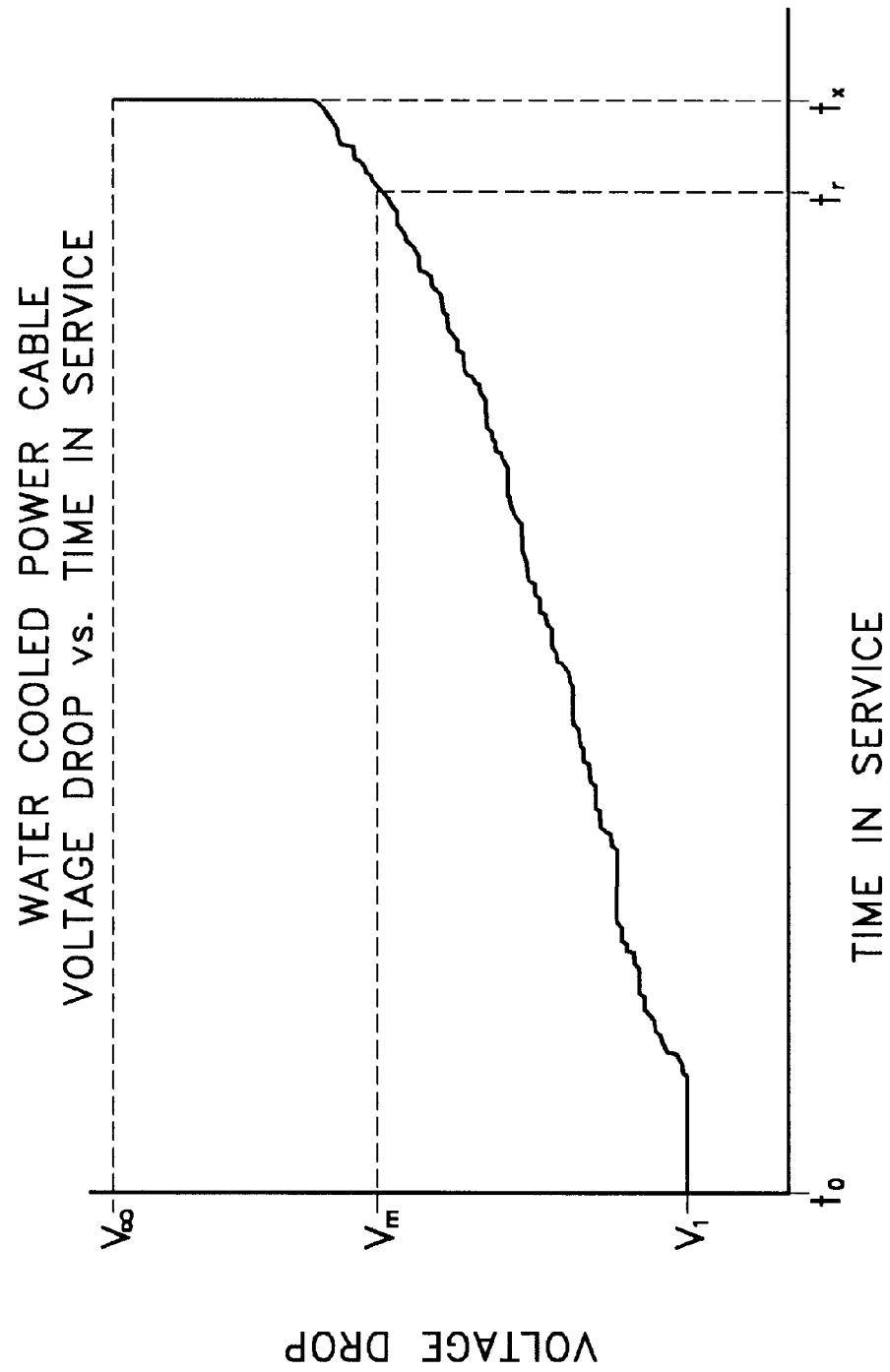
FIG. 3 is a graph representing the voltage drop across the water cooled power cable of FIG. 2 versus time in service.

FIG. 3 is a graphical comparison of the voltage drop across the water cooled power cable 16 versus the length of time the water cooled power cable 16 has been in service in the welding system 10. A new water cooled power cable 16 is placed in the welding system at time to. At to, the initial voltage drop across the water cooled power cable 16 is represented by $V_i$.

As the time in service increases, the voltage drop across the water cooled power cable 16 increases due to the breakage of the strands 25. Eventually, a point is reached at which the water cooled power cable 16 will destruct and thus cause an open circuit across the water cooled power cable 16. The corresponding point in time is represented by $t_x$. Hence, it is advantageous to be able to predict $t_x$ in order to avoid destruction of the water cooled power cable 16.

In order to prevent the above destruction of the water cooled power cable 16, a maximum allowable voltage drop, $V_m$, is identified. When the voltage drop across the water cooled power cable 16 reaches or exceeds $V_m$, the welding operation is interrupted and the water cooled power cable 16 is removed from service.

Typically, $V_i$ is between 1 and 3 volts for a new, unused water cooled power cable 16. In contrast, a water cooled power cable 16 just prior to destruction has a voltage drop of between 8 and 13 volts across it. Hence, when the voltage drop across the water cooled power cable 16 reaches $V_m$, for example, 7.5 volts, the welding operation is terminated and the water cooled power cable 16 is replaced with a new water cooled power cable 16.

It should be appreciated that the values selected for variables $V_i$, $V_m$, $t_i$, and $t_x$ in FIG. 3 could be altered based upon the characteristics of a given power cable or welding system.

Figure 4:
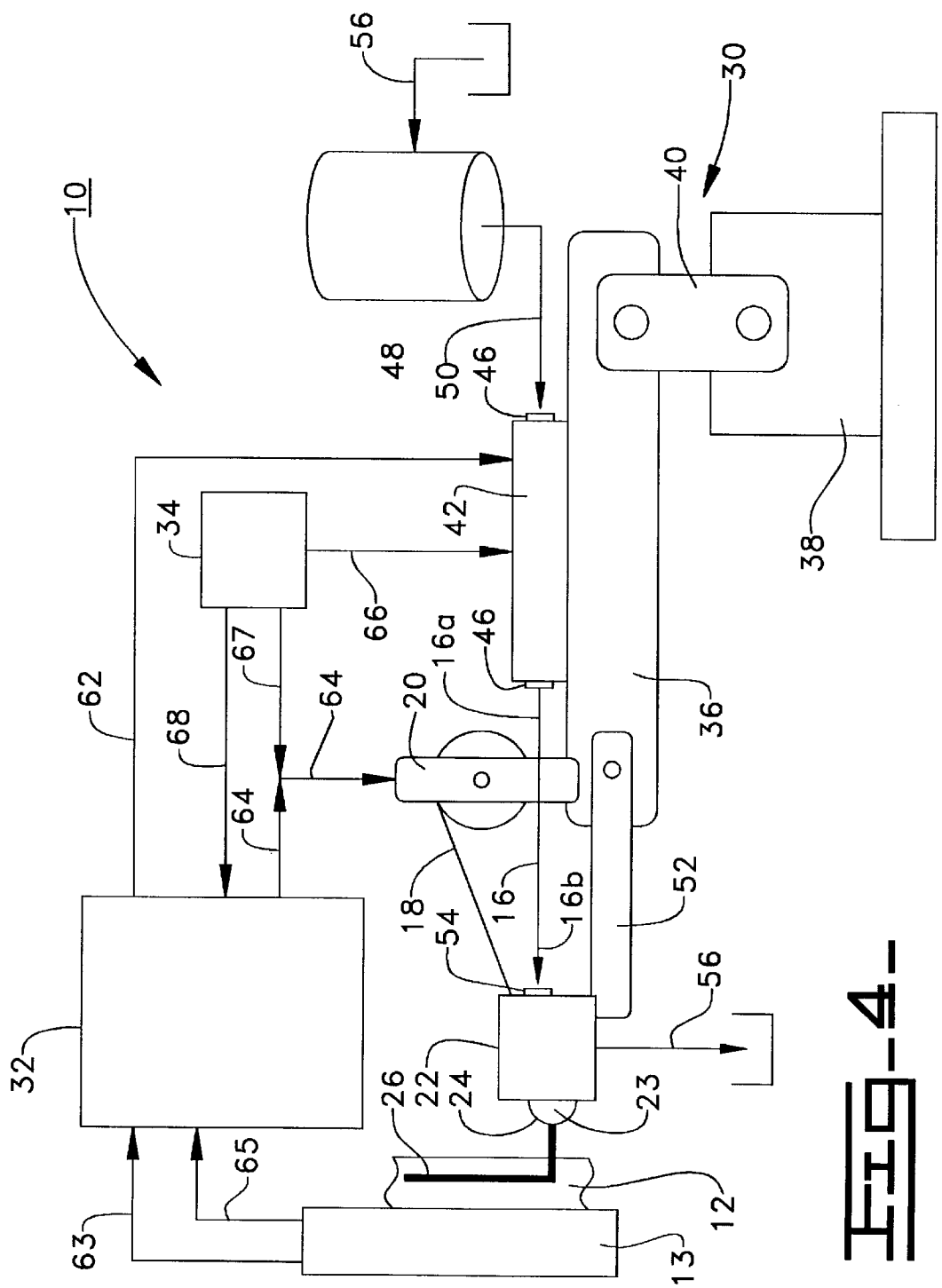
FIG. 4 is a system diagram of the arc welding system of FIG. 1.

Referring now to FIG. 4, there is shown a schematic diagram of the welding system 10. The welding system 10 includes a welding robot 30, a control system 32, and a voltmeter 34.

The welding robot 30 includes a main arm 36 which is mechanically coupled at one end to a base 38 by a pivot arm 40. The pivot arm 40 allows the main arm 36 to move relative to the base 38.

Disposed on the main arm 36 is a power block 42. The power block 42 has a channel 49 defined therein through which water may be advanced (see FIG. 6A). The power block 42 includes a first coupling 44 and a second coupling 46. The first coupling 44 receives water from a water source 48 via a water line 50. The second coupling 46 connects a first end 16a of the water cooled power cable 16 to the power block 42. Note that the water source 48 is in fluid communication with the water cooled power cable 16.

Mechanically connected to the main arm 36 is a torch arm 52. The torch arm 52 holds the torch 22. The torch 22 includes a weld tip 23 which generates a welding arc 24.

The torch 22 further includes a coupling 54 which receives a second end 16b of the water cooled power cable 16. The torch 22 also includes a water return line 56 which drains off the water that has passed through the water cooled power cable 16.

Also disposed on the main arm 36 is the wire feeder 20. The wire feeder 20 feeds the weld wire 18 to the torch 22. The wire feeder 20 is in electrical contact with the weld wire 18.

FIG. 5A is a cross sectional view of the torch 22. The water cooled power cable 16 is shown connected to the torch 22 via the coupling 54. The cable 19 is enveloped by the sleeve 17. The strands 25 of the cable 19 terminate in the coupling 54. Water passes through the fluid area 21 and into the water return line 56.

FIG. 5B is a cross sectional view taken in the direction of arrows 5B—5B of FIG. 5A. FIG. 5B shows the strands 25 circumferentialy arranged in the coupling 54. Additionally, FIG. 5B shows the fluid area 21 where water contacts the strands 25 as it passes through the coupling 54 and into the water return line 56.

As shown in FIG. 5A, the weld wire 18 is received in a passageway 58 defined in the torch 22. The passageway 58 is lined with an insulative material 60. The passageway 58 directs the weld wire 18 into contact with the weld tip 23 for the purpose of melting the weld wire 18. Once the weld wire 18 enters the weld tip 23, the weld wire is in electrical contact with the torch 22 and thus in electrical contact with the water cooled power cable 16. Hence, the weld wire feeder 20 is placed in electrical contact with the water cooled power cable 16 by the electrical path which includes the weld wire 18 and the torch 22.

Referring again to FIG. 4, the weld seam 26 is formed on the work piece 12. The work piece is supported by a support member 13 (not shown in FIG. 1).

The control system 32 has two main functions. First, it provides the necessary power to operate the welding system 10. Secondly, it directs the movements of the welding robot 30.

The control system 32 includes a positive power line 62 which is electrically connected to the power block 42. The power block 42 electrically couples the positive power line 62 to the first end 16a of the water cooled power cable 16.

FIG. 6A is a cross sectional view of the power block 42 which schematically shows the positive power line 62 electrically coupled to the power block 42. Further, the first end 16a of the water cooled power cable 16 is electrically coupled to the power block 42. In particular, the strands 25 of the cable 19 of the water cooled power cable 16 are electrically coupled to the coupling 46. In turn, the coupling 46 is electrically coupled to the power block 42.

FIG. 6B is a cross sectional view taken in the direction of arrow 6B—6B of FIG. 6A. FIG. 6B shows the strands 25 circumferentialy disposed in the coupling 46 thereby allowing water to flow from the water line 50, through the channel 49, and into the fluid area 21 of the water cooled power cable 16.

Referring again to FIG. 4, the control system 32 includes a positive sense line 64 which is electrically connected to the weld wire feeder 20. The positive sense line 64 is therefore placed into electrical contact with a second end 16b of the water cooled power cable 16 via a path which includes the weld wire feeder 20, the weld wire 18, and the torch 22.

The control system 32 further includes a negative power line 63 which is electrically connected to the support 13. Additionally, the control system 32 includes a negative sense line 65 which is also electrically connected to the support member 13.

When the weld tip 23 is in electrical contact with the work piece 12, a circuit is created whereby current flows from the control system 32 to the power block 42 via positive power line 62. Current also flows through the water cooled power cable 16 to the torch 22 via cable 19 which is internal to the water cooled power cable 16. In addition, current flows from the welding tip 23 to the work piece 12 via the welding arc 24. Finally, current flows through the support member 13 and then back to the control system 32 via the negative power line 63.

The quality of the weld produced by the welding system 10 is dependent on the ability of the control system 32 to maintain the current between the welding tip 23 and the support member 13 at a certain level. Therefore, the control system 32 measures the voltage drop from the welding tip 23 to the support member 13 by sensing a first voltage at the torch 22 with the positive sense line 64 and then sensing a second voltage at the support member 13 with the negative sense line 65. The control system 32 then adjusts the current being supplied to the positive power line 62 to keep the current between the welding tip 23 and the support member 13 at an appropriate level as the welding operation continues.

The voltmeter 34 includes a positive probe line 66 which is electrically connected to the power block 42. Referring again to FIG. 6A, the positive probe line 66 is shown schematically connected to the power block 42. This places the positive probe line 66 in electrical contact with the first end 16a of the water cooled power cable 16.

Referring again to FIG. 4, the voltmeter 34 further includes a negative probe line 67 which is electrically connected to the positive sense line 64. Therefore, the negative probe line 67 is in electrical connection with the second end 16b of the water cooled power cable 16 via the path which includes the positive sense line 64, the weld wire feeder 20, the weld wire 18 and the torch 22.

By having the positive probe line 66 electrically connected to the first end 16a of the water cooled power cable 16, and the negative probe line 67 electrically connected to the second end 16b of the water cooled power cable 16, the voltmeter 34 measures the voltage drop across the water cooled power cable 16.

The voltmeter 34 includes a programmable set point relay (not shown) which is electrically coupled to the control system 32 via a signal line 68. When the voltmeter reads a value, such as 7.5 volts, which corresponds with the maximum allowable voltage drop ($V_m$) of FIG. 3, the programmable set point relay sends a signal via the signal line 68 to the control system 32 which in turn terminates the welding process. The water cooled power cable 16 is then replaced with a new one. Hence, the water cooled power cable 16 is removed from the arc welding system 10 before it destructs and damages any of the components of the welding system or operates for some amount of time in a degraded state producing defective welds.

Figure 7:
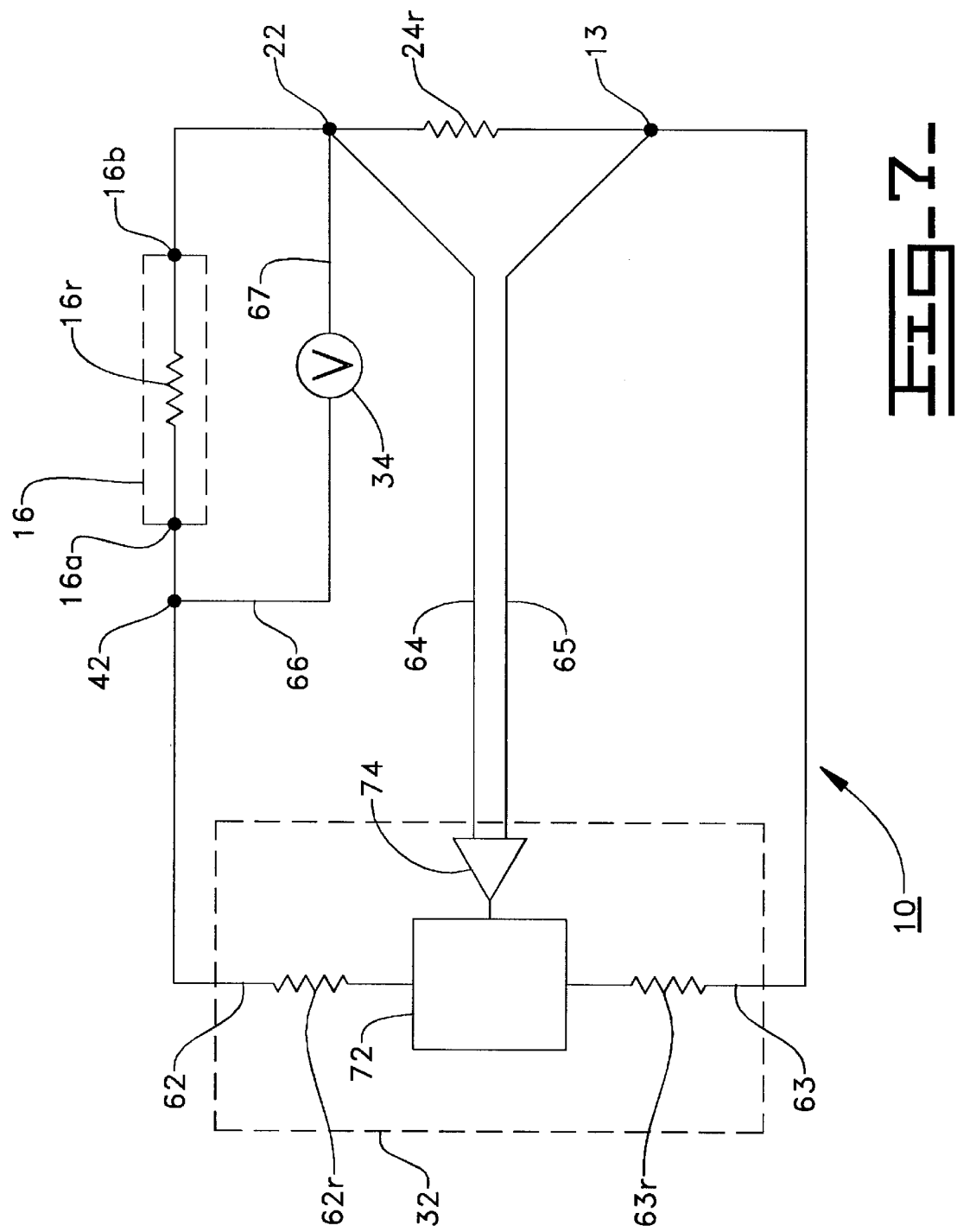
FIG. 7 is a schematic diagram of the arc welding system of FIG. 1.

Referring now to FIG. 7, the welding system 10 is shown in a schematic diagram. The welding system includes the water cooled power cable 16 having an associated resistance represented as a resistor 16r, the power block 42 (represented as a node), the torch 22 (represented as a node), the control system 32, and the voltmeter 34.

The control system 32 includes a power supply 72 and a sense amplifier 74. The control system 32 further includes the positive power line 62, with an associated resistance represented as a resistor 62r, and the negative power line 63 with an associated resistance represented as a resistor 63r. At a first end, the positive power line 62 is connected to the power supply 72. At a second end, the positive power line 62 is connected to the power block 42. Also connected to the power block 42 is the first end 16a of the water cooled power cable 16 and the positive probe line 66 of the voltmeter 34.

The second end 16b of the water cooled power cable 16, the negative probe line 67 of the voltmeter 34, and a first end of the positive sense line 64 are electrically coupled to the torch 22.

A first end of the negative power line 63 is connected to the power supply 72. A second end of the negative power line 63 and a first end of the negative sense line 65 are coupled to the support member 13 (represented as a node).

Disposed between the torch 22 and the support member 13 is the arc 24 represented as a resistor 24r. When a second end of the positive sense line 64 and a second end of the negative sense line 65 are connected to the amplifier 74, the voltage drop from the torch 22 to the support member 13 can be measured. The control system 32 uses this measurement to adjust the magnitude of the current being supplied by the power supply 72 on the positive power line 62 in order to maintain the current between the torch 22 and the support member 13 at a certain level.

The voltmeter 34 measures the voltage drop across the water cooled power cable 16. The measured voltage drop is dependent on the magnitude of resistance of resistor 16r. As the strands 25 (see FIG. 2) break, the magnitude of resistance of resistor 16r increases. Hence, the voltage drop measured by the voltmeter 34 likewise increases. When the voltage drop increases to a voltage $V_m$, such as 7.5 volts, the control system 32 terminates the welding process so that the operator can replace the water cooled power cable 16.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

What is claimed is:

1. A method for controlling an arc welding operation, comprising the steps of:

supplying a weld current to a welding tip through a flexible power cable;

while supplying said weld current to said welding tip, manipulating said welding tip to lay a weld along a predetermined path;

determining a voltage drop across said power cable due to said weld current and comparing said voltage drop to a predetermined maximum voltage drop, said predetermined maximum voltage drop corresponding to a predetermined level of fatigue in said power cable; and if said determined voltage drop is at least equal to said predetermined maximum voltage drop, immediately and automatically interrupting the supply of weld current to said welding tip and ceasing said welding operation.

2. The method of claim 1 wherein said determining step comprises measuring the voltage drop across said power cable directly.

3. The method of claim 1 wherein said predetermined level of cable fatigue is indicative of defective welds.

4. The method of claim 1 wherein said predetermined level of cable fatigue is indicative of impending destruction of said current-supply cable.

5. A welding apparatus, comprising:

an electrical current supply;

a welding tip manipulatable to lay a weld along a predetermined path;

a flexible power cable connected between said current supply and said welding tip;

a current controller operative to selectively supply weld current on demand to said welding tip through said power cable;

a system that determines a voltage drop across said power cable when said weld current is being supplied to said welding tip;

a system that compares said determined voltage drop across said power cable to a predetermined maximum voltage drop corresponding to a predetermined level of fatigue in said power cable; and a system that responds to said comparing means for immediately and automatically interrupting the supply of weld current to said welding tip if said determined voltage drop across said power cable is at least equal to said predetermined maximum voltage drop.

6. The apparatus of claim 5 wherein said determining means measures the voltage drop across said power cable directly.

7. The apparatus of claim 6 wherein said determining means comprises a voltmeter.

8. The apparatus of claim 5 wherein said means responsive to said comparing means comprises a set point relay which signals said current controller to interrupt the supply of current to said welding tip.

9. The apparatus of claim 5 wherein said predetermined level of cable fatigue is indicative of defective welds.

10. The apparatus of claim 5 wherein said predetermined level of cable fatigue is indicative of impending destruction of said current-supply cable.

11. A welding apparatus, comprising:

an electrical current supply;

a welding tip manipulatable to lay a weld along a predetermined path;

a flexible power cable connected between said current supply and said welding tip;

a current controller operative to selectively supply weld current on demand to said welding tip through said power cable;

a voltage measurement device for determining a voltage drop across said power cable when said weld current is being supplied to said welding tip, said current controller being responsive to said voltage measurement device to immediately and automatically interrupt the supply of weld current to said welding tip if said determined voltage drop across said power cable is at least equal to a predetermined maximum voltage drop.

12. The apparatus of claim 11 wherein said voltage measurement device measures the voltage drop across said power cable directly.

13. The apparatus of claim 12 wherein said voltage measurement device comprises a voltmeter.

14. The apparatus of claim 11 further comprising a set point relay which signals said current controller to interrupt the supply of current to said welding tip.

15. The apparatus of claim 11 wherein said predetermined level of cable fatigue is indicative of defective welds.

16. The apparatus of claim 11 wherein said predetermined level of cable fatigue is indicative of impending destruction of said current-supply cable.

\* \* \* \* \*